United States Patent [19]

Jesse

[11] 3,952,473
[45] Apr. 27, 1976

[54] UNIVERSAL FRAME MEMBER
[75] Inventor: Edwin L. Jesse, West Caldwell, N.J.
[73] Assignee: Evans Products Company, Portland, Oreg.
[22] Filed: Oct. 30, 1974
[21] Appl. No.: 519,066

[52] U.S. Cl. .................................. 52/656; 52/476; 403/401
[51] Int. Cl.² ...................... E04C 2/38; F16B 12/44
[58] Field of Search ............. 52/656, 475, 476, 588; 403/401, 402, 382; 49/501

[56] References Cited
UNITED STATES PATENTS

| | | | |
|---|---|---|---|
| 2,291,726 | 8/1942 | Kaufmann | 52/758 H |
| 2,874,420 | 2/1959 | Henderson | 403/382 |
| 3,028,638 | 4/1962 | Goellner | 52/758 H |
| 3,332,192 | 7/1967 | Kessler et al. | 52/588 |
| 3,349,536 | 10/1967 | Halko | 52/656 |
| 3,533,190 | 10/1970 | Hilfinger et al. | 52/656 |

FOREIGN PATENTS OR APPLICATIONS

| | | | |
|---|---|---|---|
| 1,484,108 | 4/1969 | Germany | 52/588 |

Primary Examiner—Ernest R. Purser
Assistant Examiner—James L. Ridgill, Jr.
Attorney, Agent, or Firm—Robert E. Howard

[57] ABSTRACT

A universal frame member for use in the easy assembling of frames for cabinet doors, mirrors, pictures, etc. The frame body has a decorative surface or face. The under side of the frame body has a pair of end walls and a pair of side walls extending therefrom. The end walls have a mitered angle with respect to the side walls. A flange extends from a first end wall having a lug which permits snap locking onto the second end wall of an adjacent frame body member during assembly of the frame. Screw bosses are located adjacent the second end wall to permit permanent fastening together of an assembled frame body member together with a panel member. A plurality of screw receptacles are optionally provided in a pattern for easy attachment of hinge means.

7 Claims, 4 Drawing Figures

U.S. Patent   April 27, 1976   3,952,473
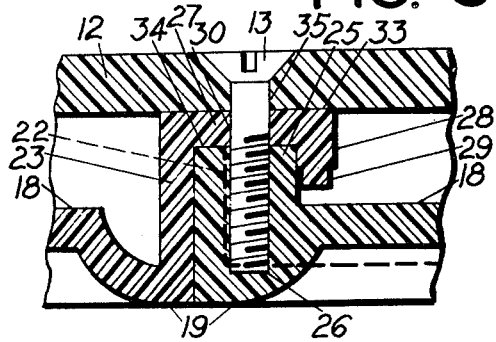
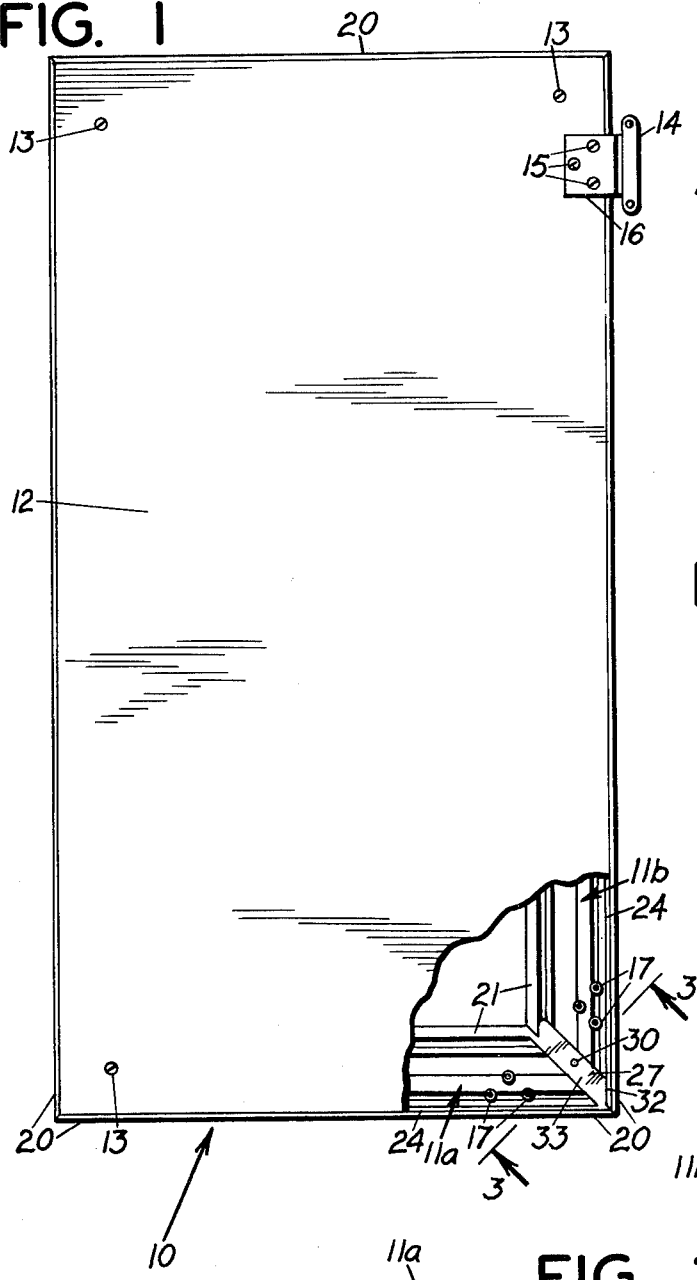
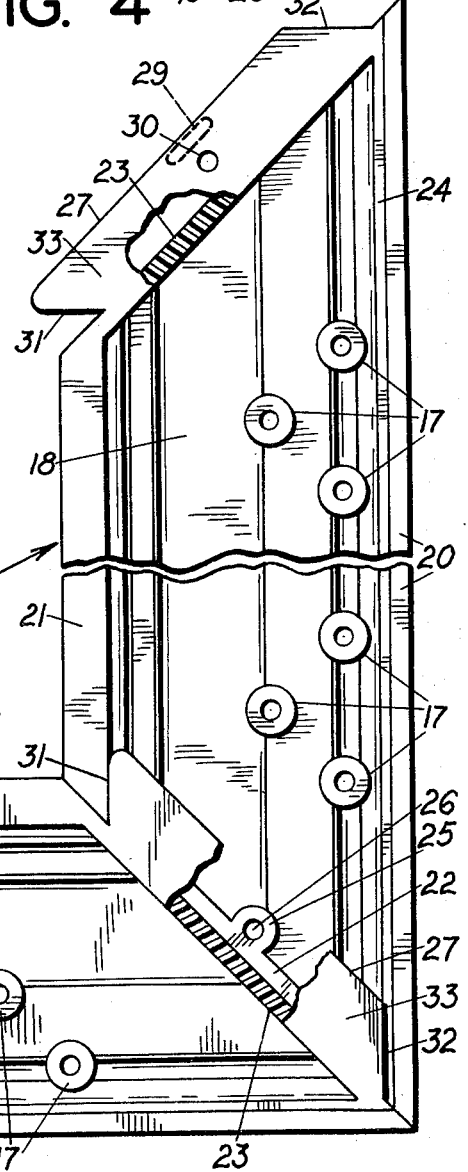
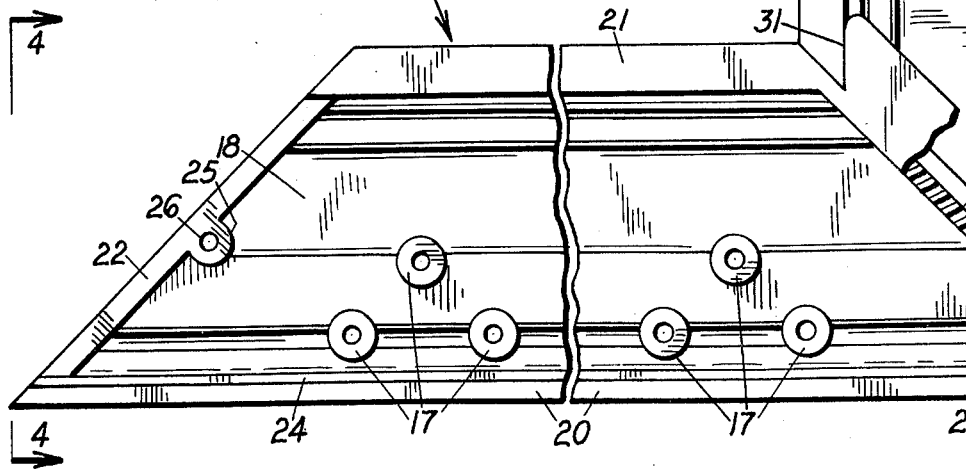

UNIVERSAL FRAME MEMBER

BACKGROUND OF THE INVENTION

It is conventional in the manufacture of cabinet doors, mirrors, pictures frames, etc., to employ a decorative frame. When such frames are made of wood, the wood can be supplied in long strips from which the frame members are cut and subsequently assembled.

More recently, frames have been made of injection molded synthetic plastic materials such as polystyrene. The frame is usually injection molded as a single piece having a decorative outer surface molded therein. However, since cabinet makers, picture framers, mirror makers, and others employ a large number of different sizes of frames, a separate mold must be employed for each size frame required. Such molds are expensive to make and maintain, and the user of such frames must carry a large inventory of the various sized frames.

It is an object of the present invention to provide a universal frame member which may be injection molded in various standard lengths and subsequently assembled in a large number of frame sizes.

It is a further object of the present invention to provide a frame member which may be easily and quickly assembled into a completed frame unit.

These and other objects of the present invention will become apparent from the following description, with particular reference to the drawing.

DRAWING

FIG. 1 is a partially cutaway view of the back side of a frame assembly of the present invention having a panel member attached thereto and showing a hinge means in place thereon;

FIG. 2 is a partially cutaway and foreshortened view of the back side of two frame members in an assembled position;

FIG. 3 is a cross sectional view taken along lines 3—3 of FIG. 1 showing the assembled joint between adjacent frame members; and FIG. 4 is a cross sectional view taken along lines 4—4 of FIG. 2 showing a cross section of the frame member of the present invention.

DESCRIPTION OF PREFERRED EMBODIMENTS

The following description will be made with reference to employing the universal frame member of the present invention employed in the manufacture of a cabinet door. However, it is to be understood that the universal frame member of the present invention may be employed with any article requiring the use of a frame, such as in the manufacture of windows, mirrors, lids, and in the framing of pictures.

Referring to FIG. 1, there is illustrated a cabinet door 10 assembled from the universal frame members of the present invention. The cabinet door 10 is formed of four frame members 11, only two of which, 11A and 11B, are shown in the cutaway portion of the drawing. The cabinet door 10 has a panel member 12 attached to the frame members 11 by means of a plurality of screws 13. Attached to the right margin of the cabinet door 10 is a hinge 14 affixed to panel member 12 by a plurality of screws 15 passing through hinge plate 16 and into screw receptacles 17 located on the under side of frame member 11. Screw receptacles 17 are located to have the same pattern as the screw holes passing through hinge plate 16. A second hinge identical to hinge 14 would be located in the lower right margin of cabinet door 10 but is not illustrated because of the cutaway portion of the drawing. Screw receptacles 17 are optional as they would only be needed where the frame is to be used for a cabinet door or the like where a hinge is required. Screw receptacles 17 would not be required where the frame is for a mirror, picture frame, or similar use.

Reference is now made to FIGS. 2 to 4 for details of the universal frame members 11 of the present invention. Two such frame members 11A and 11B are shown in an assembled position in FIG. 2. Two other frame members of identical configuration would be similarly connected to the two illustrated to complete a square or rectangular frame configuration.

In FIG. 2 the under side 18 of frame members 11A and 11B is illustrated. The decorative surface or face 19 of frame member 11 is on the opposite side of frame member 11 as shown in FIG. 4.

Frame member 11 on under side 18 thereof is comprised of an outer side wall 20, an inner side wall 21, and a pair of end walls 22 and 23. As best shown in FIG. 4, outer side wall 20 has a ledge portion 24 which is the same height as the inner side wall 21. The purpose of ledge portion 24 is to seat panel member 12, as best shown in the cutaway portion of FIG. 1. The dimension of the outer side wall 20 lying above ledge portion 24 is illustrated as being approximately equal to the thickness of panel member 12, but may be lesser or greater than such thickness if desired.

End walls 22 and 23 are at a mitered angle with respect to side walls 20 and 21. In general, the angle between outer side wall 20 and end walls 22 and 23 will be 45° in order to provide a universal fit with all other such frame members.

Located adjacent end wall 22 is a boss 25 having a screw receiving opening 26 located therein.

Located on end wall 23 is a flange 27. Flange 27 has a lip portion 28 depending from the outer longitudinal edge, and a lug 29 extending downwardly from lip 28. Lug 29 is located centrally adjacent a screw opening 30 which, when the frame members are assembled, is coaxial with the screw receiving opening 26 located on boss 25. Flange 27 extends at a mitered angle from end wall 23, which angle is generally 45°. Inner end 31 of flange 27 of frame member 11A is recessed a distance sufficient to accomodate the width of the inner side wall 21 of an adjacent frame member 11B when in the assembled position shown in FIG. 2. Simiarly, outer end 32 of flange 27 is recessed a distance sufficient to accomodate outer side wall 20 and its ledge 24 when adjacent frame members 11A and 11B are in the assembled position shown in FIG. 2. Ends 31 and 32 of flange 27 fit snugly against the inner and outer side walls 21 and 22 of an adjacent frame member when in the assembled position illustrated in FIG. 2. This snug fit helps to provide a snap locking fit of the assembled frame members. The upper surface 33 of flange 27 is coplanar with the upper surface of the inner side wall 21. The lower surface 34 of flange 27 abutts the top of an adjacent end wall 22 as shown in FIG. 3 when adjacent frame members 11 are assembled. In other words, inner side wall 21 is higher than end wall 22 by approximately the thickness of flange 27. Thus, there is provided a plurality of surfaces 17, 21, 24, and 33 which are of the same height to receive panel 12 in a flush fit and provide support therefor.

Lug 29 on flange 27 is located adjacent screw opening 30 which, as previously mentioned, is coaxial with the opening 26 in screw boss 25 when adjacent frame members 11 are assembled together. Lug 29 is positioned so that when the adjacent frame members 11 are assembled, the lug 29 press fits against the outer periphery of screw boss 25 which, in conjunction with the snug fit of the ends 31 and 32 of flange 27 with the inner and outer side walls of an adjacent member, as previously described, provides a snap locking fit. This permits the frame members to be assembled and temporarily held in place by this snap locking feature until the frame members can be permanently fastened together with fastening members such as screws inserted through holes 30 and into opening 26 of boss 25.

Once four frame members 11 have been assembled (two members 11A and 11B of which are shown in the assembled position in FIG. 2), the panel members 12 may be applied thereto and fastened into place by screw 13 or other suitable fastening member passing through opening 35 in the panel member 12, opening 30 in flange 27 and into the screw receiving opening 26 of boss 25 (as best illustrated in FIG. 3). If the frame assembly of the present invention is to be employed as a picture frame, the panel member 12 may be omitted.

After panel member 12 has been fastened to assembled frame members 11, hinge means 14 may be attached by screws 15 or other suitable fastening means passing through hinge plate 16 and into screw receptacles 17. The location of screw receptacles 17 relative to panel member 12 may be easily accomplished by use of a template or other suitable locating means.

Where the frame of the present invention is employed in the construction of a door, panel member 12 may be any material conventionally employed in such constructions, such as decorative plywood, hardboard, etc. If the frame is employed in a mirror construction, panel member 12 would be silvered glass. If the frame is employed as a picture frame, panel member 12 could be an assembly of the picture and backing material.

It is seen from the foregoing description of the present invention that a frame member 11 is provided which can be made in various lengths by injection molding techniques having the same cross sectional configuration (as illustrated in FIG. 4) and the same end wall construction which thus permits members of various lengths to be easily assembled together into a completed frame of various sizes.

I claim:

1. A universal frame member designed to be assembled together with other frame members of identical cross-section and end configuration into a generally rectangular-shaped frame comprising a body having a decorative surface and an under side to said decorative surface, a first and second end wall and an inner and outer side wall extending from said under side, said end walls being at a mitered angle with respect to the side walls, said side walls being relatively longer than said end walls, a flange extending perpendicularly outwardly from a first of said end walls, at least one fastening means receiving receptacle located along the second of said end walls, and means located on said flange for effecting a snap lock fit when two or more of said frame members are assembled together, said means for effecting a snap lock comprising a lug member extending perpendicularly downwardly from said flange at a location spaced outwardly from said first of said end walls to press fit against the periphery of the fastening means receiving receptacle of an adjacently positioned frame member.

2. The frame member of claim 1 wherein the mitered angle is 45°.

3. The frame member of claim 1 wherein a plurality of screw receiving bosses are located on the under side of said frame member body in a pattern to align with the screw holes of at least one hinge plate.

4. The frame member of claim 1 wherein said outer side wall has a ledge on the inner side thereof located at the same height as the height of the inner side wall.

5. The frame member of claim 4 wherein the upper surface of said flange is coplanar with the upper surface of said inner side wall and said ledge.

6. A universal frame member designed to be assembled together with other frame members of identical cross section and end configuration into a generally rectangular-shaped frame comprising a body having a decorative face and an under side to said decorative face, a first and second end wall and an inner and outer side wall extending from said under side, said end walls being at a 45° angle with respect to said outer side wall, said side walls being relatively longer than said end walls, a flange extending perpendicularly outwardly from the first end wall, said flange being recessed at the inner end thereof a distance sufficient to snugly accommodate the inner side wall of an adjacent body member of identical cross sectional configuration positioned at a right angle thereto, said flange being recessed at the outer end thereof a distance sufficient to snugly accommodate the outer side wall of said adjacent body member, at least one screw receiving boss located adjacent said second end wall, and at least one lug extending perpendicularly downwardly from said flange at a location spaced outwardly from said first end wall a distance equivalent to the cross sectional thickness of a screw receiving boss adjacent the second end wall of said adjacent body member whereby said lug will press fit against said boss.

7. The universal frame member of claim 6 additionally including a plurality of screw receiving bosses located on the under side of said frame member body in a pattern to align with the screw holes of at least one hinge plate.

* * * * *